United States Patent [19]

Moore et al.

Best Available Copy

[11] E Re. 30,306

[45] Reissued Jun. 17, 1980

[54] AIR INTAKE SILENCER

[75] Inventors: James W. Moore; Stephen A. Braun, both of Horicon, Wis.

[73] Assignee: Deere & Company, Moline, Ill.

[21] Appl. No.: 20,758

[22] Filed: Mar. 15, 1979

Related U.S. Patent Documents

Reissue of:

[64] Patent No.: 4,093,039
Issued: Jun. 6, 1978
Appl. No.: 684,593
Filed: May 10, 1976

[51] Int. Cl.[2] ..... F01N 1/00; F02M 35/00

[52] U.S. Cl. ..... 181/229; 181/239; 181/243; 181/272; 181/282; 220/4 E

[58] Field of Search ..... 181/229, 239, 243, 264, 181/272, 282, 269, 245; 220/4 B, 4 D, 4 E, 4 R, 8

[56] References Cited

U.S. PATENT DOCUMENTS

| | | | |
|---|---|---|---|
| 929,865 | 8/1909 | Mahony | 220/4 E |
| 3,407,958 | 10/1968 | Konijnenberg | 220/4 B |
| 3,638,756 | 2/1972 | Thiele | 181/245 |
| 3,687,225 | 8/1972 | Nelson | 181/269 |
| 3,750,840 | 8/1973 | Holme | 181/269 |
| 4,014,450 | 3/1977 | Girotti et al. | 220/4 E |

*Primary Examiner*—L. T. Hix
*Assistant Examiner*—Benjamin R. Fuller

[57] ABSTRACT

An air intake silencer includes a box-shaped expansion chamber constructed of identically dimensioned, separable halves respectively connected to a carburetor intake system and a tubular intake member. In a basic form of the silencer, the tubular intake member includes a metal tube mounted in the expansion chamber and having a single elongate opening in communication with the interior of the chamber, the tube being connected so as to form a continuation of a hose located exteriorly of the chamber. For obtaining more effective silencing, air distribution and filtering the basic form of the silencer may be altered by dividing the expansion chamber in half with a perforated baffle plate and/or by substituting a perforated metal tube for the aforedescribed metal tube.

9 Claims, 10 Drawing Figures

FIG. 2
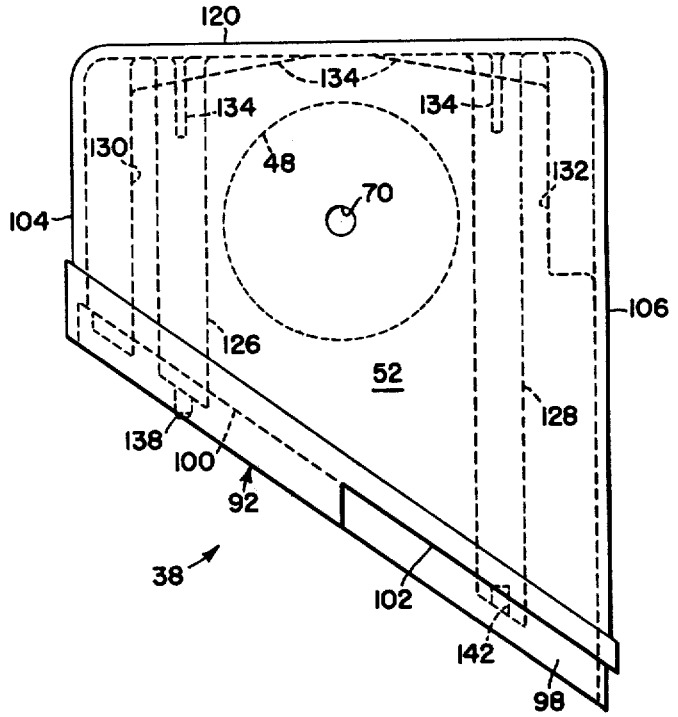
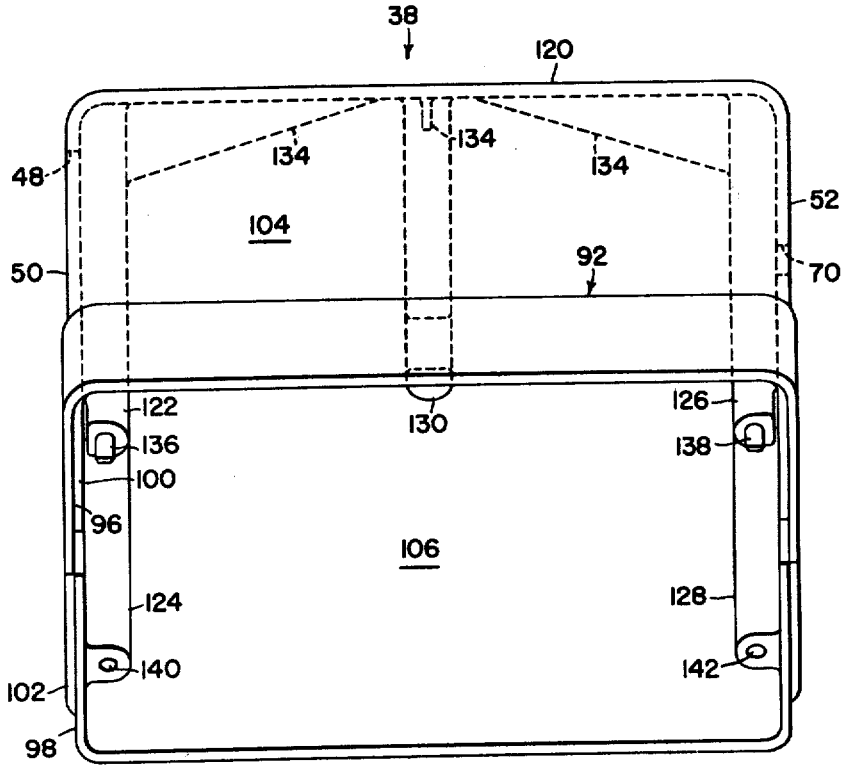
FIG. 3

FIG. 6
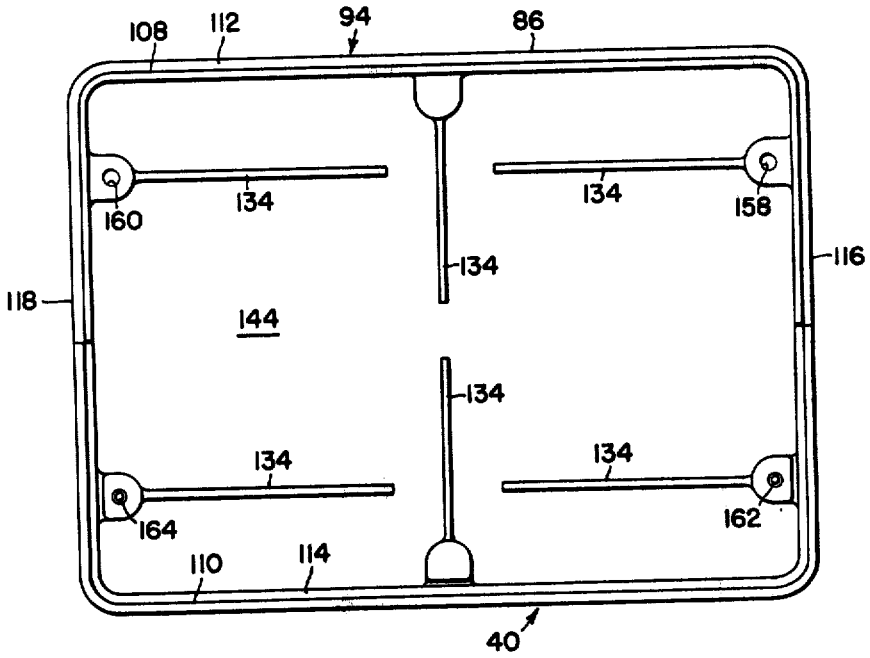
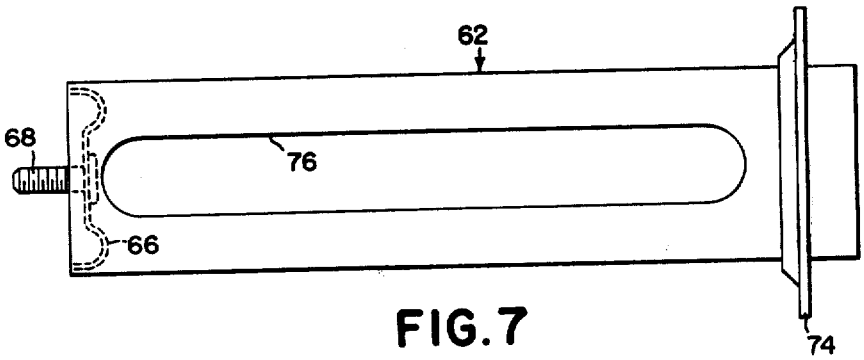
FIG. 7

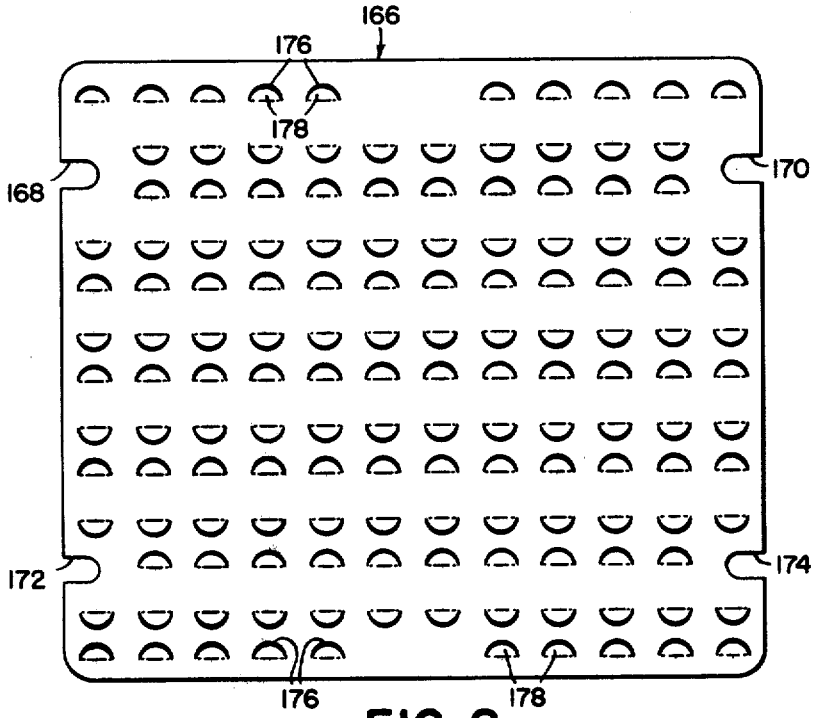
FIG. 8
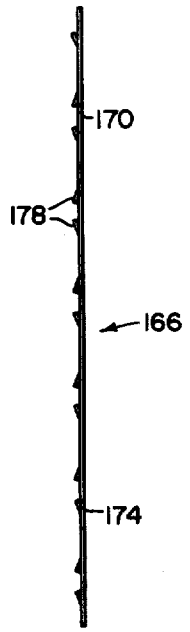
FIG. 9
FIG. 10
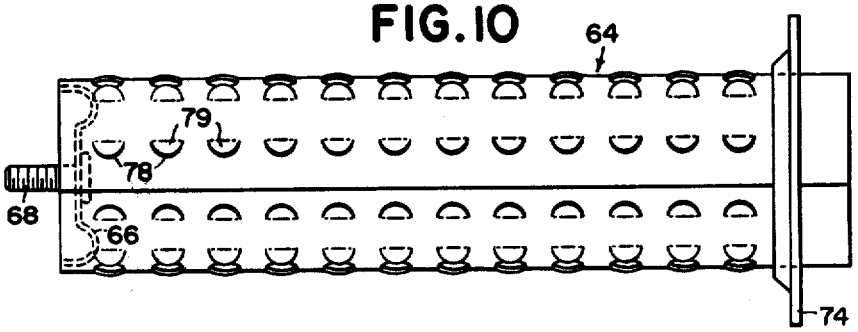

AIR INTAKE SILENCER

Matter enclosed in heavy brackets [ ] appears in the original patent but forms no part of this reissue specification; matter printed in italics indicates the additions made by reissue.

BACKGROUND OF THE INVENTION

The present invention relates generally to devices for muffling noises emitted from the combustion air induction system of an internal combustion engine.

Two-cycle internal combustion engines have seen increasing use in the recreational vehicle market. The aspiration system of a two-cycle engine causes air to be gulped into the carburetor system and results in a loud noise having a frequency which is a function of the engine speed. These factors have created a great deal of interest in silencing two-cycle engine air induction systems.

Early air intake silencers merely consisted of enclosures, such as a console or hood over the engine or a box around the carburetor system, lined with sound absorbing material. While these constructions worked very well at frequencies above 1500 Hertz, they were marginally effective on low frequency intake noise and often were constructed such that the sound absorption material became saturated with fuel from carburetor spit-back.

As two-cycle engines became more powerful and thus, noisier, it became necessary to make silencers which would muffle intake noise in the frequency range below 1500 Hertz. Heretofore, this has been done by constructing air intake silencers according to the principles applied to exhaust mufflers. The simplest of these exhaust muffler designs is a tail pipe attenuator, a low pass acoustical filter which consists of an expansion chamber having a length of pipe connected thereto. Studies show that this type of silencer will attenuate noise only in certain limited frequency ranges that are a function of the tail pipe length and that other frequencies may actually be amplified. The studies also show that the maximum degree of attenuation is determined by the volume of the expansion chamber, the larger the chamber the greater the attenuation. Because the intake noise harmonics shift in frequency as the engine speed changes, it is impossible to design a simple silencer, using tail pipe attenuator principles, with a broad enough attenuation range to cover a substantial part of the frequencies under 1500 Hertz. Accordingly, the most effective silencers heretofore constructed have included several reactive chambers tuned for different frequency ranges and many of these silencers have had one or more of the disadvantages of being large, complex, expensive and restrictive to air intake inflow which adversely affects the carburetor process.

SUMMARY OF THE INVENTION

According to the present invention, there is provided a novel air intake silencer and more particularly there is provided an intake silencer which is effective on low frequency as well as high frequency noise.

A broad object of the invention is to provide an intake silencer which is of a relatively simple, inexpensive construction and which effectively attenuates intake noise and at the same time permits flow therethrough with minimum restriction and in a manner compatible with the throttle control of the carburetor so as to not seriously affect the carburetor process or the engine performance.

Another object of the invention is to provide an air intake silencer having a basic silencing structure to which additional elements may be selectively added to gain more effective silencing if desired.

A more specific object is to provide an air intake silencer including an expansion chamber constructed from identically dimensioned and configured molded chamber halves fit together with overlapping lips or flanges which allow a minimum of sound and air leakage without requiring gasket material.

Still another object is to provide an air intake silencer which can be adapted to a wide variety of different engines, carburetion systems and locations in an engine compartment by constructing the expansion chamber such that holes may be cut in various areas of the walls thereof for connection to air inlet and outlet tubular members.

Yet another object of the invention is to provide an air intake silencer which can easily be removed or partially dismantled to gain access to the carburetor system to service or adjust the latter.

A more specific object of the invention is to provide an air intake silencer having an expansion chamber which may be divided into two compartments by means of a baffle plate having a plurality of openings therein for effecting even air distribution to multiple carburetor systems, providing filtering of incoming air and for muffling high frequency noises coming from the engine intake system by causing a non-linear distortion of the high amplitude sound waves.

Still another object of the invention is to provide an air intake silencer having a baffle plate, as described above, with the baffle plate being easily installable and removable.

Yet another object of the invention is to provide an air intake silencer having an expansion chamber to which is connected an extended inlet which may optionally be formed by a first tube, having only a single elongate opening therein to communicate air into the chamber, or a second tube, having a plurality of louvred openings therein to communicate air into the chamber.

These and other objects will become apparent from a reading of the following description in conjunction with the appended drawings.

BRIEF DESCRIPTION OF THE DRAWINGS

FIG. 2 is a left side elevational view of the top half of the expansion chamber of the silencer shown in FIG. 1.

FIG. 3 is a left side view of the chamber half shown in FIG. 2.

FIG. 6 is a top view of the chamber half shown in FIG. 5.

FIG. 7 is a view of one type of the tube which may be used to form a part of the air inlet member and to form a cylindrical compartment within the expansion chamber.

FIG. 8 is a view of the downstream side of a baffle plate which may be mounted in the expansion chamber so as to divide the latter into two compartments.

FIG. 9 is a right end view of the baffle plate shown in FIG. 8.

FIG. 10 is a view of a second type of tube which may be used in lieu of the tube shown in FIG. 7.

DESCRIPTION OF THE PREFERRED EMBODIMENT

The present invention is here described as being used to silence a two-cycle internal combustion engine of a snowmobile, however, it is to be understood that this is merely a representative application of the invention and that it may be used to silence four-cycle engines used on vehicles other than snowmobiles.

Figure 1:
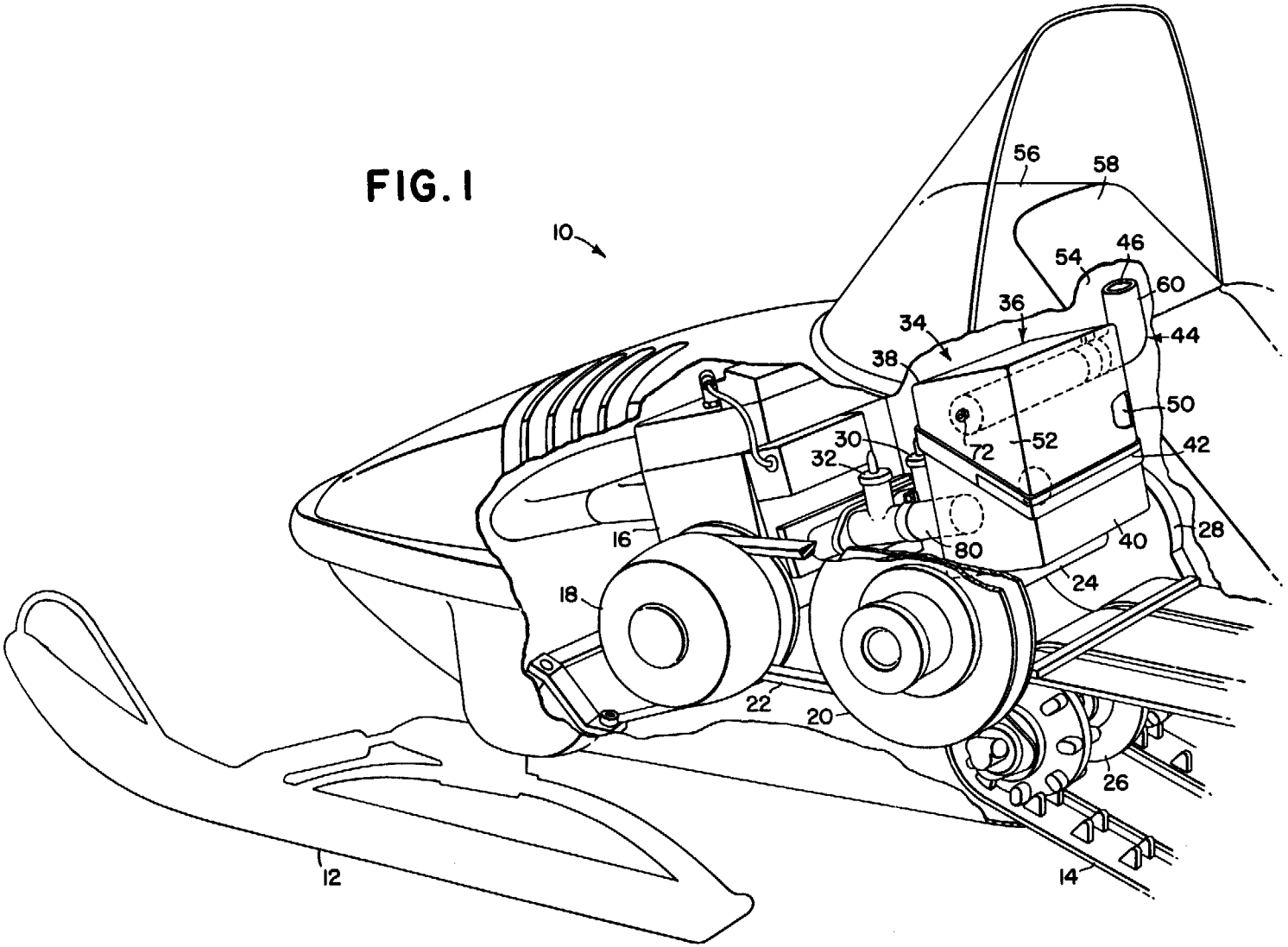
FIG. 1 is a schematic left rear perspective view of the forward end of the snowmobile with parts broken away exposing an air intake silencer constructed according to the principles of the present invention.

In the description that follows, terms such as right, left, top, bottom, front, and rear are used throughout with reference to the invention being positioned, as shown in FIG. 1, and to the normal forward direction of travel of the vehicle.

Referring now to FIG. 1, therein is shown a forward portion of a snowmobile 10. The snowmobile 10 is supported at its forward end by a pair of ski assemblies 12 (only one shown) and at its rearward end by a suspended drive track 14. The track 14 is driven by means of an engine 16 coupled thereto by transmission means including a variable speed primary clutch 18 coupled to a crankshaft extension (not visible) of the engine 16, a secondary clutch 20 connected to the clutch 18 by a drive belt 22 and coupled so as to impart rotation to a countershaft 24, and track drive elements 26 connected to the countershaft 24 by a drive chain assembly (not shown) located in a chain case 28.

Mounted on a rear surface of the engine 16 are right and left carburetors 30 and 32, respectively. Provided for the purpose of delivering air to and for silencing noise emitted from the carburetors 30 and 32 is an air intake silencer 34. The silencer 34 includes a box-shaped expansion chamber 36 constructed of identically dimensioned and configured upper and lower chamber halves 38 and 40, respectively telescopically interconnected, as at 42, in a manner to be presently described. It is herenoted that some sort of band or strap (not shown) would normally be engaged with at least the upper half 38 so as to hold the latter downwardly against the lower half 40, the latter normally being supported on a support surface (not shown) of the snowmobile 10.

Preferably, the chamber halves 38 and 40 are cast or molded from a plastic material such as acrylonitrile butadiene styrene (abbreviated, ABS) however, any material which would prevent sound transmission through the walls thereof would be suitable. It will be appreciated that a cost savings in the manufacture of the expansion chamber 36 may be realized due to the fact that the halves 38 and 40 can be made from the same die or mold.

Air is admitted into the expansion chamber 36 by means of a tubular member 44 having an open upper end 46 from which it extends first downwardly and then leftwardly through an opening 48 (FIG. 2) in a right side wall 50 of and into engagement with an inner surface of a left side wall 52 of the upper chamber half 38 with that part of the member 44 which is inside the chamber 36, in effect, acting as a tubular compartment therein which extends the range of frequencies over which the silencer is effective beyond that possible with only the chamber 36 and the part of the member 44 exteriorly of the chamber 36. The open end 46 of the tubular member 44 is located in a plenum chamber or void 54 partly bounded by a hood portion 56 and an instrument panel 58. The members forming the chamber 54 may be lined with sound absorbing material (not shown) for additional silencing.

The tubular member 44 includes a first section in the form of a hose 60 (FIG. 1) located entirely outside of the chamber 36 and a second section having only a right end located outside of the chamber 36 and connected to the hose 60. The second section of the member 44 is preferably made of metal and may either be like a tube 62 (FIG. 7) or like a tube 64 (FIG. 10) with the selection of the tubes 62 and 64 depending upon their respective abilities in filtering, distributing and silencing in a given application of the intake silencer 34.

The tubes 62 and 64 are each cylindrical and each has a support strap 66 welded in its left end, each strap 66 supporting a threaded stud 68 which is located along the longitudinal axis of a respective one of the tubes 62 and 64. When either of the tubes 62 and 64 installed, the stud 68 will project through a hole 70, provided in the left side wall 52 of the upper chamber half 38, and will receive a nut 72 (FIG. 1). A resilient seal 74 is received on a right end portion of each of the tubes 62 and 64 and each is for the purpose of sealing the space between the periphery of the opening 48 and a respective one of the tubes 62 and 64. The only difference between the tubes 62 and 64 is that the portion of the tube 62 adapted to be located between the walls 50 and 52 of the upper chamber half 38 is provided with but a single elongate opening 76 extending lengthwise of the tube 62, through which air flows into the chamber 36, while the corresponding portion of the tube 64 is provided with a plurality of openings or perforations 78 respectively having a plurality of louvres 79 associated therewith. It is herenoted that the opening 76 and the openings 78 act to give the effect of tubes of various lengths so as to extend the range of sound frequencies over which the tube is effective for silencing.

The openings 78 are arranged in rows and the louvres 79 associated with the openings 78 of adjacent rows are inclined towards each other to effect intermixing of air flowing through the openings of adjacent rows. The louvres also serve to trap a volume of air in the vicinity of the holes and this function together with that of intermixing the air has been found to increase the silencing effectiveness of the silencer.

Figure 5:
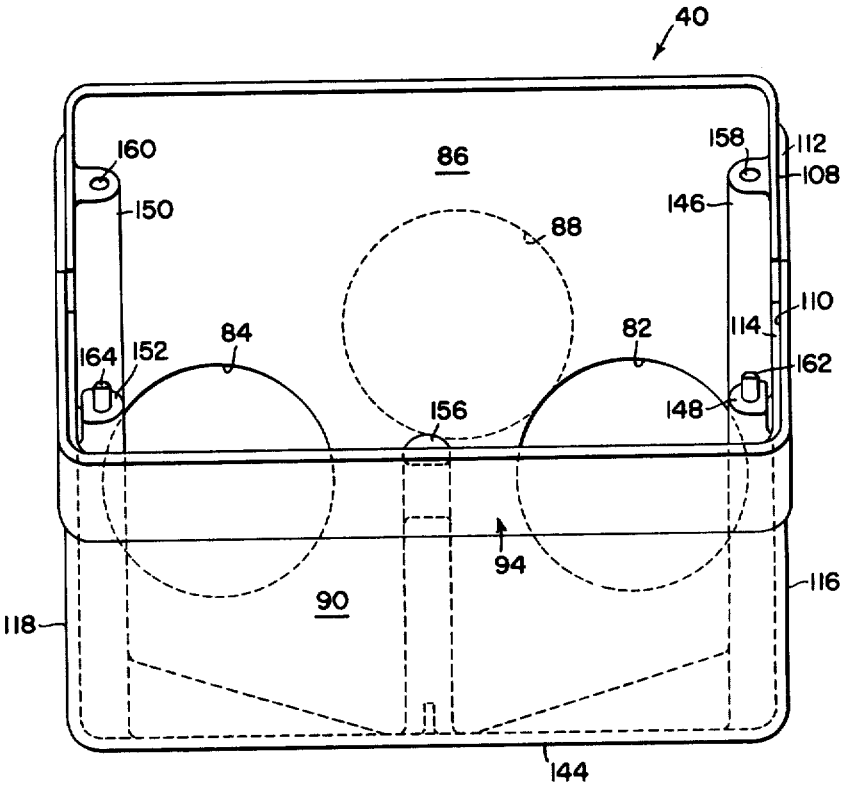
FIG. 5 is a right side view of the chamber half shown in FIG. 4 and in addition showing the location that a single outlet might occupy when the expansion chamber is coupled to an engine having a single carburetor.

Air leaves the expansion chamber 36 via a pair of transversely spaced hoses 80 (only the left hose is shown) which respectively couple the intake of the carburetors 30 and 32 to right and left openings 82 and 84 (FIG. 5) provided in a forward wall 86 of the lower chamber half 40. It is to be understood that the openings 82 and 84 may be spaced differently if necessary to accommodate connection to other dual carburetor configurations or that only a single opening 88, for example, (see dashed lines in FIG. 5) would be cut in the wall 86 if the carburetor system consisted of only a single carburetor.

It is herenoted that for the purpose of providing easy access to the air intakes of the carburetors 30 and 32 via the openings 82 and 84 and the hoses 80, the respective lower and upper ends of the upper and lower chamber halves 38 and 40 are constructed to terminate in respective planes which are parallel to each other and to the telescopic joint 42 which inclines upwardly and from rear to front as viewed from the side. This results in the forward wall 86 of the lower chamber half 40 being higher than a rear wall 90 and, as can best be seen in FIG. 5, the openings 82 and 84 are located in the wall 86 so as to be at least partially above the level of the top of the rear wall 90 so as to permit a tool to be inserted through the openings 82 and 84 to aid in adjusting the carburetors 30 and 32.

Figure 4:
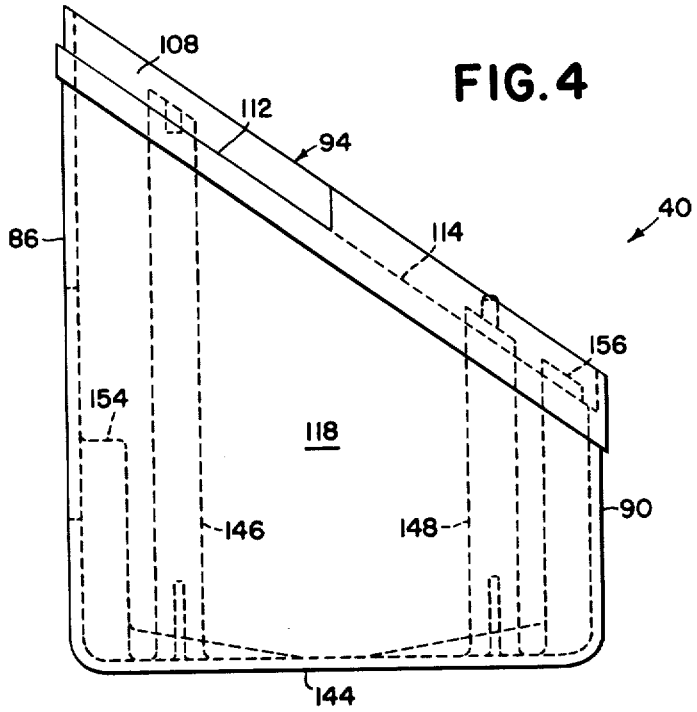
FIG. 4 is a left side elevational view of the bottom half of the expansion chamber of the silencer shown in FIG. 1.

The telescopic joint 42 is formed by interfitting certain surfaces of a peripheral flange 92, (FIG. 2) at the bottom of the upper chamber half 38, with certain surfaces of a peripheral flange 94, (FIG. 4) at the top of the lower chamber half 40. Specifically, the flange 92 includes interior and exterior recessed surfaces 96 and 98, respectively, defining inner and outer downwardly facing shoulders 100 and 102, the surface 96 extending across a forward wall 104 of and rearwardly halfway along the right and left side walls 50 and 52 of the upper chamber half 38, and the surface 98 extending across a rearward wall 106 of and forwardly halfway along the right and left side walls 50 and 52. Similarly, the flange 94 includes exterior and interior recessed surfaces 108 and 110, respectively, defining upwardly facing shoulders 112 and 114, the surface 108 extending across the front wall 86 of and rearwardly halfway along right and left side walls 116 and 118, respectively, of the chamber half 40, and the surface 110 extending across the rear wall 90 of and forwardly halfway along the right and left side walls 116 and 118 of the chamber half 40. The recessed surfaces 96 and 98 of the upper chamber half 38 respectively telescopically embrace the recessed surfaces 108 and 110 of the lower chamber half 40 when the chamber halves 38 and 40 are joined, as shown in FIG. 1, the shoulders 100 and 102 then being respectively engaged with the shoulders 112 and 114.

For the purpose of preventing the walls of the expansion chamber 36 from pulsating and radiating noise in response to intake noise pulses impinging thereupon, they are constructed with stiffener means molded integrally with the interior thereof. Specifically, the upper chamber half 38 includes a top wall 120 and arranged perpendicular to and having upper ends integral with the wall 120 are right front and rear ribs 122 and 124 respectively, formed integrally with the right side wall 50, left front and rear ribs 126 and 128, respectively, formed integrally with the left side wall 52, and front and rear ribs 130 and 132, respectively, formed integrally with the front and rear walls 104 and 106. It is herenoted that in order to provide a flat wall in which outlet openings such as the openings 82, 84 and 88 may be cut, the walls 86 and 106 have relatively large unstiffened areas. Noise transmission through these areas may be diminished by applying a thin sheet of viscoelastic or other suitable damping material (not shown) to the walls 104 and 106 by means of an adhesive, as is conventional in the art.

Additional stiffening is provided by a plurality of gussets 134 joined to the top wall 120 and respectively to the ribs 122–132. All of the ribs except for rib 132 have downwardly facing lower end surfaces, which are coplanar with each other.

Right and left downwardly projecting pins 136 and 138 are respectively located centrally in the end surfaces of the right and left front ribs 122 and 126; and upwardly extending holes 140 and 142 are respectively located centrally in the end surface of the right and left rear ribs 124 and 128.

Similarly, the lower chamber half 40 includes a bottom wall 144 and arranged perpendicular to and having lower ends integral with the wall 116 are right front and rear ribs 146 and 148, respectively, formed integrally with the right side wall 116, left front and rear ribs 150 and 152, respectively, formed integrally with the left side wall 118, and front and rear ribs 154 and 156, respectively, formed integrally with the front and rear walls 86 and 90. With the exception of front rib 154, all of the ribs of the chamber half 40 have upwardly facing upper end surfaces, which are coplanar with each other. Right and left downwardly extending holes 158 and 160 are respectively located centrally in the end surfaces of the right and left front ribs 146 and 150; and upwardly projecting pins 162 and 164 are respectively centrally located in the end surfaces of the right and left rear ribs 148 and 152.

When the halves 38 and 40 are brought together, as shown in FIG. 1, the right and left front ribs 122 and 126 of the half 38 are respectively aligned with the right and left front ribs 146 and 150 of the half 40 and the pins 136 and 138 are respectively received in the holes 158 and 160; and the right and left rear ribs 124 and 128 of the half 38 are aligned with the right and left rear ribs 148 and 152 of the half 40 and the pins 162 and 164 are respectively received in the holes 140 and 142.

In order to provide an air filter, to provide for even air distribution to the openings 82 and 84 and to increase the noise silencing effectiveness of the silencer 34, the chamber 36 may be divided into two compartments by means of a rectangular baffle plate 166 (FIGS. 8 and 9). The plate 166 is dimensioned so that it may be supported in sandwiched relationship between the coplanar lower surfaces of the ribs 122–130 of the upper chamber half 38 and the coplanar upper surfaces of the ribs 146–152 and 156 of the lower chamber half 40. When the plate 166 is so installed, front right and left notches 168 and 170, respectively will receive the pins 136 and 138 while rear right and left notches 172 and 174, respectively, will receive the pins 162 and 164. For the purpose of conveying air between the upper and lower chambers 38 and 40, respectively, the plate 166 is provided with a plurality of rows of perforations 176. Associated with each of the perforations 176 is a louvre 178 and it is to be noted that the louvres 178 in adjacent rows are inclined towards each other. The plate 166 is to be installed in the chamber 36, as described above, with the louvres 178 located on the lower side of the plate 166 so that streams of air passing through the perforations 176 of adjacent rows will be deflected toward each other by the louvres 178. The intermixing of these streams of air aids in attenuating sound waves directed toward the perforations 176.

The operation of the air intake silencer 34 is as follows. Assuming the silencer 34 to be in a basic form wherein only the tube 62 is located in the chamber 36, engine 16 will act to cause air to be sucked into the intakes of the carburetors 30 and 32 from the expansion chamber 36 via the openings 82 and 84 and the hoses 80. This air is of course, immediately replaced by air which is drawn into the chamber 36 from the void 54 via the hose 60 and tube 62, with the air entering the chamber 36 via the elongate opening 76 in the tube 62. In the event that the air exiting from the opening 76 does not arrive evenly distributed at the openings 82 and 84, the flow may be "tuned" for such even distribution by rotating the tube 62 so as to redirect the air exiting from the opening 76.

Sound waves emitted from the carburetor intakes will impinge against the walls of the expansion chamber 36 and will be precluded from transmission therethrough due to the stiffness of the walls effected by the ribs 122–132 and 146–156. If additional prohibition of noise transmission is desired, thin sheets of commercially available noise damping material may be glued on the exterior of the chamber 36 where desired.

If air filtering and more sound wave attenuation is desired, the perforated tube 64 may be substituted for the tube 62, in which case the perforations 78 serve to filter incoming air and the perforations 78 and louvres 79 serve to produce the increased attenuation by mixing incoming air flow and by trapping small volumes of air adjacent the perforations. The principles of the attenuation attributable to the openings 78 and louvres 79 is quite complex but the effect of the openings 78 and louvres is readily discernible on standard noise measuring instruments.

If still further air filtering and attenuation and a more even distribution of air to the carburetor system is desired, the baffle plate 166 may be installed in the chamber 36. Because the plate 166 further compartmentalizes the chamber 36, sound wave frequencies, in addition to those attenuated by the undivided chamber 36, are attenuated with the additional frequencies being a function of the volumes of the two compartments. The perforations 176 and louvres 178 will also act to filter and distribute incoming air and act to further attenuate sound waves impinging on the plate 166, due to the air flow mixing and air volume trapping functions thereof.

Of importance is the fact that no matter what form of the invention is used, there will always be sufficient air flow to the carburetors 30 and 32 for the engine 16 to operate properly.

Also, it will be appreciated that access to the carburetors 30 and 32 may be easily attained by removing the air silencers 34 therefrom by disconnecting the hoses 80 and that access to the intakes of the carburetors 30 and 32 for the purpose of adjusting the same by inserting a tool in the intakes thereof, may be easily attained by removing the upper chamber half 38 from the lower chamber half 40.

Further, it will be appreciated that inasmuch as the halves 38 and 40 are identically dimensioned and formed, they can be made on the same die or mold, so as to reduce manufacturing costs, and that inlet and outlet openings can then be added therein as desired.

While the tube 64 and baffle plate 166 are here shown as having louvred openings, it is to be understood that a large variety of openings or perforations may be provided in them without any appreciable sacrifice in the filtering, air distribution and noise attenuation functions of the tube 64 and baffle plate 166.

We claim:

1. An expansion chamber for an air intake silencer, comprising: upper and lower identically dimensional and configured chamber halves; said upper chamber half including a closed top wall joined to a depending wall means having a lower end defined by a first flange and terminating in first plane inclined upwardly from a rear location to a front location of the lower end; said lower chamber half including a closed bottom wall joined to an upright wall means having an upper end defined by a second flange and terminating in a second plane which is parallel to the first plane; said first and second flanges defining respective connection surface means which cooperate to form a telescopic joint whereby the lower and upper ends respectively of the depending and upright wall means are releasably joined together; an air inlet opening means being provided in the depending wall means of the upper chamber for connection to a tubular inlet member; and an air outlet opening means, for connection to carburetor intake means, being provided at a forward location in the upright wall means of the lower chamber at a level which places at least a portion of the outlet opening means at a level above a rear location of the second flange whereby easy access may be had to the air outlet opening means, when the upper chamber half has been disconnected from the lower chamber half, so that carburetor adjustments may be made by inserting a tool through the outlet opening means.

2. The expansion chamber defined in claim 1 wherein a baffle plate containing perforations is supported in the expansion chamber such that one side of the plate cooperates with the upper chamber half to form a first compartment while another side of the plate cooperates with the lower chamber half to form a second compartment.

3. The expansion chamber defined in claim 2 wherein said perforations are positioned in a plurality of rows; each perforation having a louvre extending thereabove and located on said other side of the plate; and the louvres of adjacent rows of said perforations being inclined toward each other.

4. The expansion chamber defined in claim 1 wherein the depending and upright wall means respectively of the upper and lower chamber halves each include a plurality of interior stiffener ribs; and certain ribs of the upper chamber half extending from the closed top wall and being respectively aligned with and connected to certain ribs of the second chamber half extending from the closed bottom wall whereby the expansion chamber includes stiffener ribs which traverse the telescopic joint.

5. The expansion chamber defined in claim 4 wherein said certain ribs of the upper and lower chamber halves each have end surfaces which are located adjacent the telescopic joint; the end surfaces of the certain ribs of the upper chamber half being coplanar with each other, and the surfaces of the certain ribs of the lower chamber half being coplanar with each other and parallel to the end surfaces of the certain ribs of the upper chamber half; and a perforated baffle plate mounted in said expansion chamber in sandwiched relationship between the end surfaces of the certain ribs of the upper chamber half and the end surfaces of the certain ribs of the lower chamber half.

6. The expansion chamber defined in claim 5 wherein the end surfaces of some of the certain ribs of the upper chamber half are provided with pins projecting therefrom which are respectively received in holes located in some of the end surfaces of some of the certain ribs of the lower chamber half, and vice-versa, and said baffle plate including passages respectively having the pins of the upper and lower chamber halves extending therethrough.

*7. An air intake silencer for an internal combustion engine, comprising: an expansion chamber of a generally rectangular box configuration including top and bottom walls joined by front, rear and opposite sidewalls; an air inlet opening provided in one of the walls at an upper location in the box; an air outlet opening provided in the front wall at a lower location in the box; and said box being made up of upper and lower sections releasably joined at a*

*joint which, in side view, is inclined upwardly from a rear location, at a level below that of at least a portion of the air outlet opening, to a front location at a level above that of the air outlet opening.*

*8. The air intake silencer defined in claim 7 wherein a baffle plate containing perforations is supported in the expansion chamber such that one side of the plate cooperates with the upper section to form a first compartment while another side of the plate cooperates with the lower section to form a second compartment.*

*9. The air intake silencer defined in claim 7 wherein the joint is composed of cooperating interior surfaces; and said baffle plate being sandwiched between and supported by said surfaces.*

* * * * *